United States Patent [19]
Marchevka

[11] 3,867,683
[45] Feb. 18, 1975

[54] DC-TO-AC-TO-DC-INVERTER
[75] Inventor: Franz Marchevka, Dortelweil, Germany
[73] Assignee: Hartmann & Braun-Mess-und Regeltechnik Aktiengesellschaft, Frankfurt, Germany
[22] Filed: Sept. 24, 1973
[21] Appl. No.: 400,270

[30] Foreign Application Priority Data
Oct. 7, 1972 Germany.......................... 2249223

[52] U.S. Cl.................................... 321/2, 321/45 S
[51] Int. Cl. ........................................... H02m 3/32
[58] Field of Search ......... 321/2, 11, 16, 45 S, 45 R

[56] References Cited
UNITED STATES PATENTS

| | | | |
|---|---|---|---|
| 2,922,958 | 1/1960 | Dean.................. | 321/2 X |
| 2,987,665 | 6/1961 | Thompson........... | 321/2 |
| 3,328,669 | 6/1967 | Ahmed et al. ...... | 321/45 R |
| 3,439,252 | 4/1969 | Sikes et al........... | 321/11 |
| 3,515,967 | 6/1970 | McLaughlin et al. | 321/27 R |

Primary Examiner—William H. Beha, Jr.
Attorney, Agent, or Firm—Ralf H. Siegemund

[57] ABSTRACT

Dc-ac-dc inverter with galvanically separated input and output circuits by means of a transformer and having only two input terminals and two output terminals, further having a rectifier for connecting the transformer secondary to the output terminals, and switching transistors connecting the transformer primary to the input terminals; circuit includes specifically: a self-starting - self-sustaining relaxation oscillator which is connected for controlling the transistors, and having a pair of power input terminals; impedance means such as forwardly biased diodes or a Zener diode are connected serially between one of the input terminals and to the transformer primary for developing a voltage drop upon flow of current into the inverter, that constant voltage drop is applied to the input terminals of the oscillator to provide power thereto. The inverter may include a starter circuit for providing for a temporary shunt and by-pass for the input current, so that the voltage drop can be developed even if the switching transistors are all off.

8 Claims, 2 Drawing Figures

3,867,683

DC-TO-AC-TO-DC-INVERTER

BACKGROUND OF THE INVENTION

The present invention relates to a dc-ac-dc inverter with input circuit, output circuit and transformer separation for these circuits; the a.c. needed for the transformer results from electronical switching of the d.c. input using for example switching transistors which are controlled by an oscillator e.g., of the relaxation variety. The invention, therefor, relates specifically to improvements in inverters of that type.

In the field of control engineering for processing measured inputs generally and for the design of process controllers, supervising apparatus or other data acquisition devices, very often the problem arises that electrical potentials seem to intermesh. Particularly, measuring signals are often needed in different points in a processing and acquisition circuit, and these signals become active therein and at different levels of potential. Since such signals are usually derived from a d.c. transducer one employs for example d.c. separation circuits with galvanically separated input and output circuits to obtain the needed separation and insolation. Quite often this separation function is obtained by a isolation amplifier.

Special precautions are also required, quite frequently by law, when a circuit is operated in a gaseous environment which could explode if ignited e.g., by electrical arcing. As long as the particular circuit consumes little energy, it can be protection proofed by itself to obtain complete separation and isolation from such a potentially dangerous and endangered environment. Particularly in the field of measuring and control engineering, very low currents are used, particularly when the circuits are transistorized, so that protection can be provided for on that basis.

A typical circuit component which separates d.c. signals and different d.c. voltage potential levels from each other is an dc-ac-dc inverter having an intermediate a.c. stage, which provides for transformer type coupling between d.c. input and d.c. output circuits, so that these input and output circuits are completely galvanically separated. The German printed patent application No. 1,230,119 discloses such an inverter which includes a transformer with center tapped primary, and two transistor switches are provided which are alternatingly rendered conductive and non-conductive via a self sustained relaxation oscillator. This way, d.c. is alternatingly coupled to the two halves of the primary for magnetizing the transformer core. A rectangular a.c. voltage can be taken from the secondary, which is rectified and available as d.c., representing the d.c. input voltage of that inverter.

This circuit has the disadvantage, that one needs a supplemental power source for energizing the relaxation oscillator. Thus, not only is it necessary to provide for the separation and safety features of the inverter as far as its principle input and output circuits is concerned, but the oscillator and its voltage supply must now have the necessary safety features, which in turn requires additional components.

SUMMARY OF THE INVENTION

It is an object of the present inverter to provide a dc-ac-dc inverter with self-sustained relaxation oscillator for control and in which the afore-mentioned drawbacks have been eliminated.

In accordance with the preferred embodiment of the invention, it is suggested to use the input d.c. voltage of the dc-ac-dc inverter for tapping therefrom the needed voltage supply for a self-sustained relaxation oscillator, tapping to be provided particularly by means of an impedance element which connects serially to the d.c. input circuit and across which the needed supply voltage is developed as voltage drop.

As a consequence, the dc-ac-dc inverter remains to the external world a passive quadrupole which does not need any external power supply, such as connections to the mains etc. Such a passive quadrupole can be used anywhere in a circuit and may be constructed as a complete (and encapsuled) component in standardized configuration and dimensions. Such a box has simply two input terminals and two output terminals and can be interposed in any two signal lines, where ever there is the possibility of or need for a shift in potential levels.

Using such a passive quadrupole for protection of and in areas which are a potential source of explosion, protects other instruments in such areas as well. The dc-ac-dc inverter in such a box does contain active circuit elements such as transistor amplifiers etc., but they do not require connection to any other voltage sources which connections required heretofor additional features for protection so as to comply with safety requirements.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
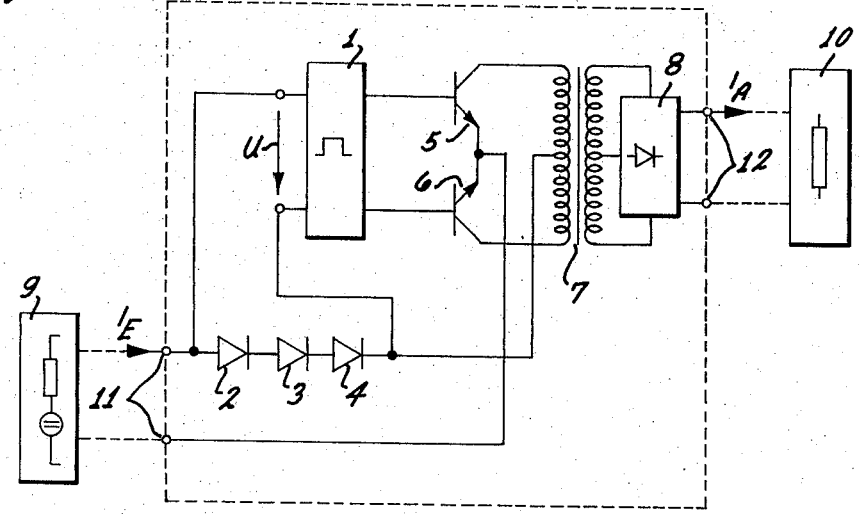
FIG. 1 is a block and circuit diagram of a first example of the preferred embodiment of the present invention.

Proceeding now to the detailed description of the drawings, the dotted outlining in FIG. 1 denotes a passive quadrupole constructed as dc-ac-dc inverter with two input terminals 11 and two output terminals 12. The inverter includes two transistors 5 and 6 connected for push-pull operation in conjunction with the primary winding of a transformer 7. Reference numeral 1 denotes a self-sustaining relaxation oscillator whose output terminals are connected to the base electrodes of the two transistors 5 and 6 for controlling them in phase opposition as to conduction and non-conduction.

The transformer secondary is connected to a rectifier 8 whose d.c. output terminals connect to the output terminals 12 of the quadrupole. The input terminals 11 connect between the interconnected emitter electrodes of transistors 5 and 6 and the center tap of the transformer primary. Thus, input and output terminals of the quadrupole are galvanically separated from each other by the transformer.

Reference numeral 9 denotes a measuring transducer or the like which furnishes a particular d.c. voltage and is connected to the input terminals 11 of the inverter. Reference numeral 10 denotes an output device (load) which can be a measuring instrument, indicator or plotter or a data acquisition device. The dc-ac-dc inverter interconnects devices 9 and 10 under complete galvanic separation.

The transducer 9 provides a d.c. connect $I_e$ which flows into terminals 11. Transistors 5 and 6 are alternatingly rendered conductive and non-conductive by operation of oscillator 1 so that the current $I_e$ flows between the center tap of the primary and one or the other half thereof in alternating sequence. The resulting a.c. current in the secondary is rectified at 8, and a d.c. current $I_a$ leaves the quadrupole via terminals 12 for the load 10. Current $I_a$ is proportionate to current $I_e$.

The input current flows additionally through three, serially interconnected semiconductor diodes 2, 3, 4. The current passes through them in the passing direction, so that a voltage equivalent to the conductor threshold is available across each diode, three fold in the particular configuration. That voltage drop U across the three diodes is quite independant from any variations of $I_e$, so that the voltage U is independant from the d.c. signal that is being transmitted.

The voltage U is supplied to relaxation oscillator 1 as power supply. Since that oscillator is (usually) a constant load device, it is effective as a constant level attenuation for the input signal which does not distort the measured valve.

If the input d.c. voltage does not vary widely, or if the oscillator is provided with its own input threshold and constant voltage device or is otherwise insensitive to input voltage variations, then it is permissible to use a mere resistance in lieu of the diodes. However, somewhere in the oscillator circuit there is a constant voltage or current element to under the oscillator frequency independent from such variations.

Figure 2:
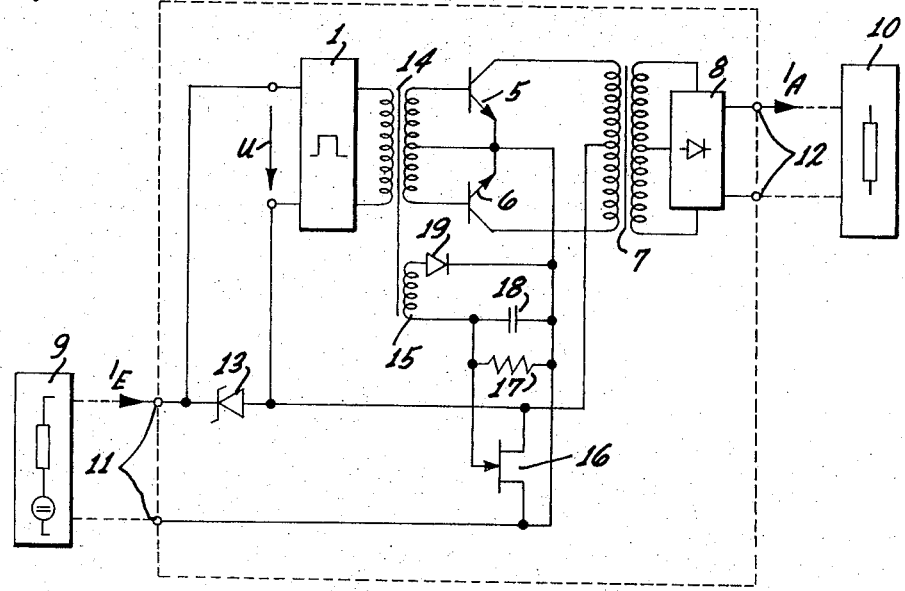
FIG. 2 is a block and circuit diagram of a second example of the preferred embodiment of the present invention.

FIG. 2 illustrates a modified version for a dc-ac-dc inverter. Reference numerals 1, 5, 6, 7, 8, 9 and 10 are similar to FIG. 1. However, the base circuits for the transistors 5 and 6 are also galvanically separated from the input circuit by means of another transformer, 14. Moreover, the circuit of FIG. 2 includes a starter circuit for triggering the relaxation oscillator.

The input current $I_e$ as furnished by transducer 9 first passes through a Zener diode 13, in the direction of Zener effect development. The Zener voltage is again the voltage U which powers the relaxation oscillator 1. The rectangular output wave train of oscillator 1 is applied to the primary of transformer 14 whose (one) secondary connects to the base electrodes of transistors 5 and 6 with a center tap connection to the emitter connection of the two transistors.

The input circuit of the inverter includes additionally a field effect transistor (FET) 16 which is connected with its source and drain electrodes across the two terminals 11. FET 16 operates as switch and high and low ohmic shunting impedance. The gate voltage for FET 16 is taken from the transformer 14, via a second secondary 15 thereof, as well as via a rectifier diode 19 and a RC circuit comprised of a capacitor 18 and a resistor 17. Resistor 17 has high ohmic resistence. Therefor, a substantially ripple free control voltage can be taken from across the capacitor 18 having polarity to render FET 16 non-conductive. This condition is maintained as long as $I_e$ is not zero.

Assuming $I_e$ is zero, for example because the quadrupole has been disconnected, no voltage is developed in the secondary circuit of transformer 14 so that capacitor 18 is discharged; it had been discharged previously across resistor 17 as soon as no voltage was developed across winding 15 of transformer 14. Thence, FET 16 is not blocked, but is in the low ohmic state.

As soon as input current $I_e$ flows into the inverter, no current flows into the transformer primary as yet, because both transistors 5 and 6 are non-conductive. The inverter can commence operation only after oscillator 1 recommences operation.

The oscillator is started as follows:

The current $I_e$ can flow into the inverter, even with both transistors 5, 6 being blocked, as long as FET 16 is conductive and sufficiently low ohmic. Its channel will conduct some current as long as the gate voltage does not throttle the current flow. Of course FET 16 must not provide for a short circuit, but serves merely as a low impedance by-pass or shunt.

Since current can flow into the quadrupole, a voltage drop will soon develop across Zener diode 13, and the operating voltage U for the oscillator 1 is generated. Shortly thereafter oscillator 1 will begin to operate and transistors 5 and 6 are rendered alternatingly conductive.

The voltage drop across transformer secondary 15 charges capacitor 18, and FET 16 is rendered non-conductive as soon as the shut off threshold has been exceeded. The regular operation has now been resummed whereas the d.c. input current $I_e$ is inverted into a.c. by operation of the switching as provided by the input-current-driven oscillator 1. Throughout the operation, in the beginning as well as during subsequent stationery operation complete galvanic separation of input and output circuits of the inverter is provided for.

The starter circuit could also be used if the diodes of FIG. 1 or a resistor rather than the Zener diodes is used as voltage source for the oscillator. The starter circuit is needed only, if leakage current is insufficient to start the oscillator.

The FET 16 could be replaced by a capacitor, having capacitance so that as soon as input current $I_e$ begins to flow, the capacitor will charge. That charge current is only a temporary one, but may suffice for developing voltage U to start up the oscillator. Elements 15, 17, 18, 19 are not needed under these conditions. However, care must be taken here to avoid undue reduction in response of the measuring system by operation of such a capacitor.

The invention is not limited to the embodiments described above but all changes and modifications thereof not constituting departures from the spirit and scope of the invention are intended to be included.

I claim:

1. DC-AC-DC inverter with galvanically separated input and output circuits by means of a transformer and having only two input terminals and two output terminals, further having a rectifier for connecting the transformer secondary to the output terminals, two switching transistors for connecting the transformer primary to the input terminals, and a self-starting - self sustaining oscillator connected for controlling the transistors, the oscillator having a pair of power input terminals and a pair of oscillator output terminals, the latter output terminals being connected to control the two switching transistors, so that these two transistors drive input current in alternating directions through the primary, the improvement comprising:

impedance means connected serially and galvanically between one of the inverter input terminals and the transformer primary and being passed through by an input current as flowing through the inverter input terminals for developing a voltage drop upon flow of the input current into the inverter, through the switching transistors and through the transformer primary; and circuit means connecting the impedance means to the power input terminals of the oscillator for applying the said constant voltage drop to the oscillator to provide power thereto.

2. Inverter as in claim 1, wherein the impedance means are plural, serially connected diodes passed through by the input current of the inverter in their directions of conduction.

3. Inverter as in claim 1, wherein the impedance means includes a Zener diode passed through by the input current of the inverter and in backward direction of the diode.

4. Inverter as in claim 1, wherein a by-pass is provided in the inverter input circuit for input current flow even when the transistors are not conductive, so that a voltage drop can develop across the impedance means for starting the oscillator.

5. Inverter as in claim 4, wherein the by-pass includes a switch operated for opening the by-pass circuit after the oscillator has begun to render the transistors alternatingly conductive.

6. Inverter as in claim 5, wherein the switch is a FET.

7. Inverter as in claim 5, wherein the transistor base circuits are galvanically separated from the oscillator through a second transformer, the second transformer having a particular winding connected to control said bypass switch.

8. Inverter as in claim 1, wherein the transistor base circuits are galvanically separated from the oscillator through another transformer.

* * * * *